Patented July 30, 1929.

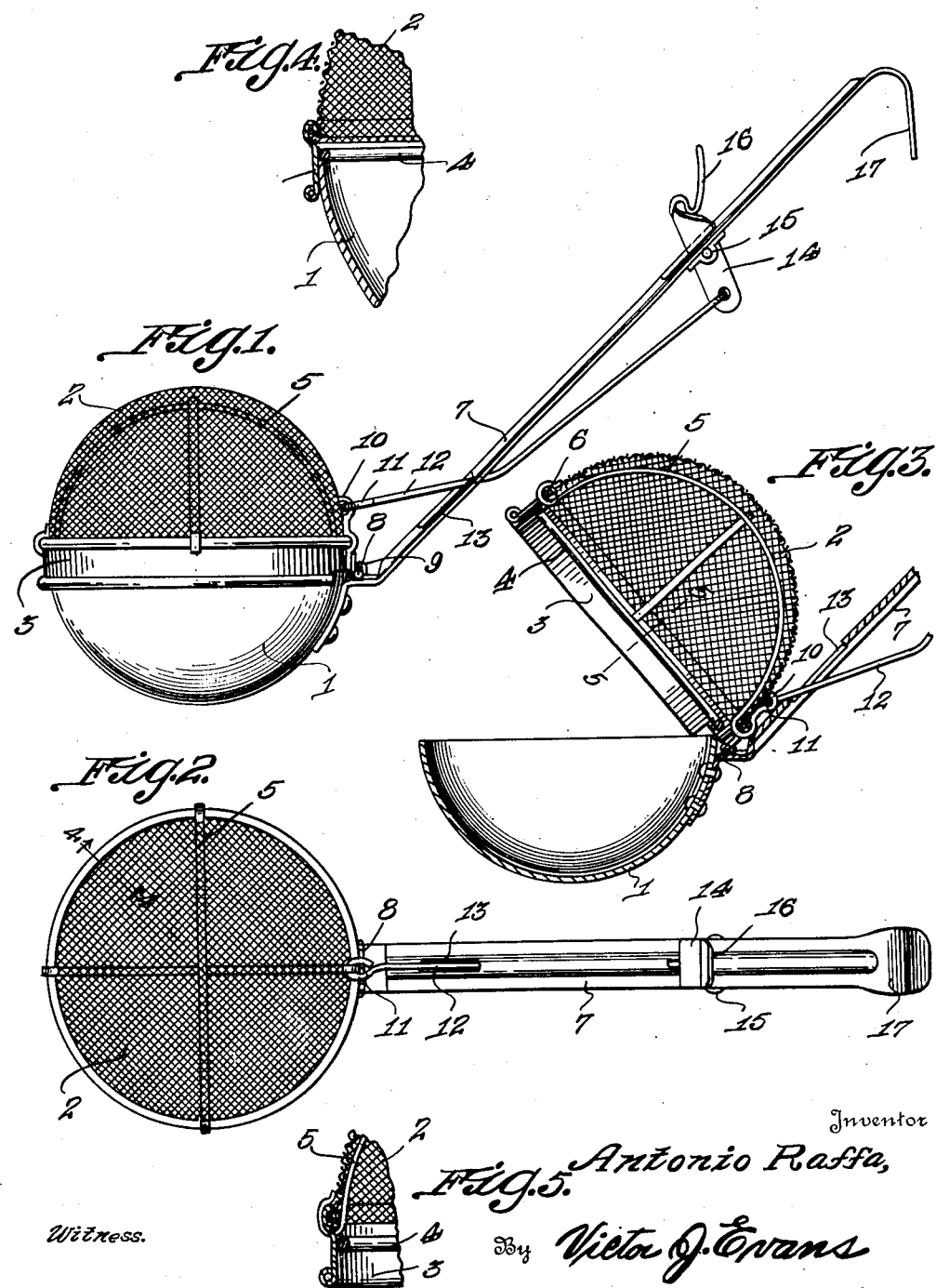

1,722,946

UNITED STATES PATENT OFFICE.

ANTONIO RAFFA, OF BROOKLYN, NEW YORK.

COOKING UTENSIL.

Application filed July 9, 1928. Serial No. 291,276.

My present invention has reference to a cooking utensil, my primary object being the provision of an article for this purpose that comprises a spherical bowl made up of two sections which are hingedly connected, one of the sections being reticulated and forming what may be termed a top for the other section, in which latter food stuff, either meats or vegetables, is arranged and cooked and whereby excessive steam or vapor from the cooking action is let through the reticulated section, and further whereby the reticulated section serves as a strainer whereby the liquid from the cooked material may be drained and further whereby the reticulated section may be readily moved to open position with respect to the non-reticulated section so that the cooked material in the latter may be delivered therefrom.

To the attainment of the foregoing and other objects which will present themselves, the invention consists in the improvement hereinafter described and definitely claimed.

In the drawings:

Figure 1 is a side elevation of a cooking utensil in accordance with this invention.

Figure 2 is a top plan view thereof.

Figure 3 is a detail enlarged sectional view showing the reticulated section of the improvement swung to open position.

Figure 4 is a detail sectional view approximately on the line 4—4 of Figure 2.

Figure 5 is a detail sectional view approximately on the line 5—5 of Figure 2.

As disclosed by the drawings, the bowl of my improvement is in the nature of a sphere. The bowl, however, comprises a semi-spherical non-reticulated section 1 which may be formed of any desired material suitable for holding food stuffs to be cooked therein. The second section of this receptacle is indicated by the numeral 2 and is reticulated. This section, at its open edge has fixed thereon a ring flange 3 that is designed to frictionally engage with the mouth of the receptacle, when the section 2 is swung over the section 1. This limits the movement of the section 2 in the direction of the section 1. There is arranged in the ring a continuous bead 4. The mesh comprising the body of the reticulated section 2 is protected by a skeleton metal frame 5, the same being preferably in the nature of right-angular metal strips which are centrally connected and arched upon themselves and have their ends passed through the beaded outer edge 6 of the ring flange 3 in which bead the edge of the reticulated section 2 is received and clamped.

Fixed on one side of the non-reticulated bowl section 1, there is the curved end of an angularly disposed metal handle 7. The handle, adjacent to its juncture with the bowl section 1, has a straight portion on which is fixed one leaf of a hinge 8, the second leaf being fixed to the ring flange 3. Preferably but not necessarily the hinge 8 is influenced by a spring 9 whereby the bowl section 2 is automatically swung to closed position on the bowl section 1.

The end of one of the longitudinally arranged members of the skeleton frame 5 has its end, adjacent to the hinged connection with the bowl section 1 and handle 7 extended for a suitable distance against the outer face of the reticulated section 2 and is from thence rounded upon itself, as at 10, to provide what may be termed an eye. This rounded portion 10 has received therethrough the eye end 11 of a rod 12. The rod 12 being constructed of metal embodies a determined amount of natural resiliency. This rod is directed through an elongated slot 13 in the angularly arranged upwardly disposed handle 7. The rod comprises an angle member and the outer end thereof is loosely connected to the lower or depending portion of a throw lever 14. The lever 14 is pivotally secured, as at 15, to the under face of the handle 7, the outer face of the said lever passing through an elongated opening in the said handle and this end of the throw lever is provided with a finger piece 16. The outer extremity of the handle 7 is provided with a hook 17 whereby the device may be suspended when not required for use.

With my improvement it will be noted that broths may be cooked in the bowl section 1 of the receptacle and the juice thereof strained through the reticulated section 2 on the bowl, while a slight pressure on the finger piece of the throw lever will open the reticulated section 2 and permit of the contents of the bowl 1 being removed therefrom. It will be also apparent that meats for other purposes, vegetables, eggs and other food stuff may be easily and conveniently cooked in my improvement and it will be obvious that the reticulated top 2 of the bowl permits of the percolation of vapors from the stuff which is cooked in the bowl section. It will be further apparent that when the finger piece 16 is moved in a second direction to influence the rod 12 to close the reticulated section 2 of the improvement, the said rod will contact with the upper end wall provided by the slot 13 and by virtue of such contact will hold the section 2 closed on the section 1, and for this reason, and as heretofore stated, the employment of the spring 9 is not an absolute requirement, as it is impossible to swing the section 2 to open position as long as the rod 12 is in frictional contact with the upper wall of the slot 13 in the handle 7.

Having described the invention, I claim:

A cooking utensil comprising a spherical bowl made up of two semi-spherical sections, one of which being reticulated, a non-reticulated ring member surrounding the edge of the reticulated section having an inner bead for contacting the edge of the non-reticulated section for limiting the movement of the reticulated section thereagainst, said reticulated section having an open arched reinforcing frame therein whose ends are passed through the ring for holding the latter on said section, a handle fixedly secured to the non-reticulated section and extending at an angle therefrom, the member of the frame disposed opposite the handle being extended against the outer face of the reticulated section and having its end rounded, a wire rod of natural resiliency having an eye end received through the said rounded end of the frame member, said handle having an elongated slot through which the rod passes, and against whose upper edge the rod is designed to frictionally contact when the reticulated section is swung on the non-reticulated section for holding both sections closed, said rod having an angle extension and a centrally pivoted finger piece connected to the handle and to which the free end of the rod is also connected.

In testimony whereof I affix my signature.

ANTONIO RAFFA.